United States Patent

[11] 3,595,474

[72] Inventor Jürgen Humpert
 Hemer-Fronsberg, Germany
[21] Appl. No. 861,278
[22] Filed Sept. 26, 1969
[45] Patented July 27, 1971
[73] Assignee Friedrich Grohe Armaturenfabrik
 Hemer, Germany
[32] Priority Sept. 27, 1968
[33] Germany
[31] P 17 75 814.4

[54] HOT AND COLD WATER MIXING VALVES
 13 Claims, 9 Drawing Figs.
[52] U.S. Cl. .................................... 236/12,
 137/454.2, 137/614.7
[51] Int. Cl. ...................................... G05d 23/00
[50] Field of Search .......................... 137/549,
 454.2, 614.17; 236/12

[56] References Cited
UNITED STATES PATENTS

| | | | |
|---|---|---|---|
| 2,542,273 | 2/1951 | Brown | 236/12 A |
| 2,672,157 | 3/1954 | Branson | 236/12 |
| 3,331,390 | 7/1967 | Hoffman | 137/454.2 |
| 3,363,650 | 1/1968 | Scaramucci | 137/614.17 |

Primary Examiner—Meyer Perlin
Assistant Examiner—Ronald C. Capossela
Attorney—Michael S. Striker ABSTRACT: A mixing valve for controlling the flow of hot and cold fluids with temperature controlled through thermostatic means. The fluid lines connecting to the valve contain within the valve connections, sleeve members having passages displaced from each other. These passages are fully closeable and fully openable through 90° of rotation of the sleeve member. The sleeve member is, furthermore, provided with a check valve and filter, and a hollow insert member on the check valve is operatively coupled to the sleeve member. When the hollow insert member is rotated, the sleeve member is rotated therewith, so that the hollow insert member is fully removable and insertable from and into the sleeve member when the latter is in fully closed position.

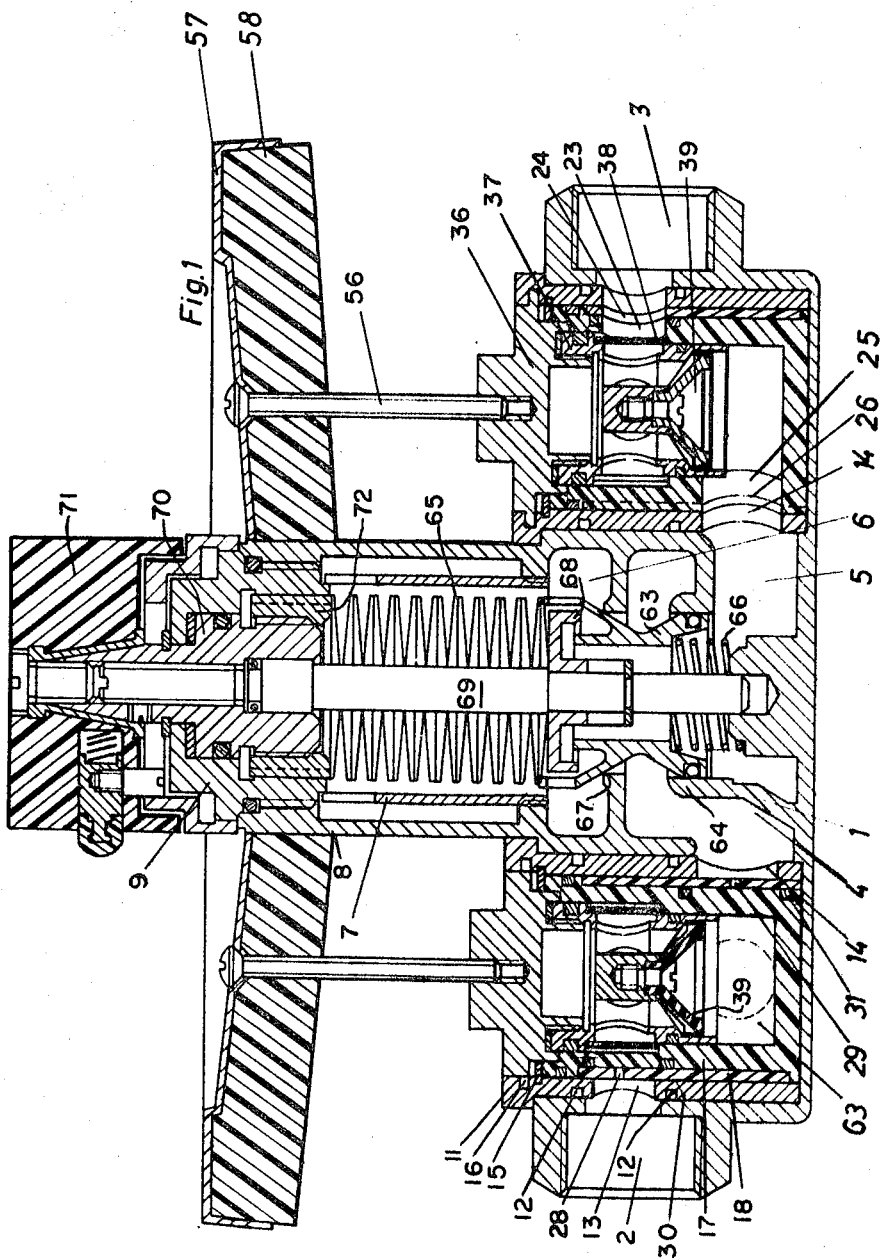

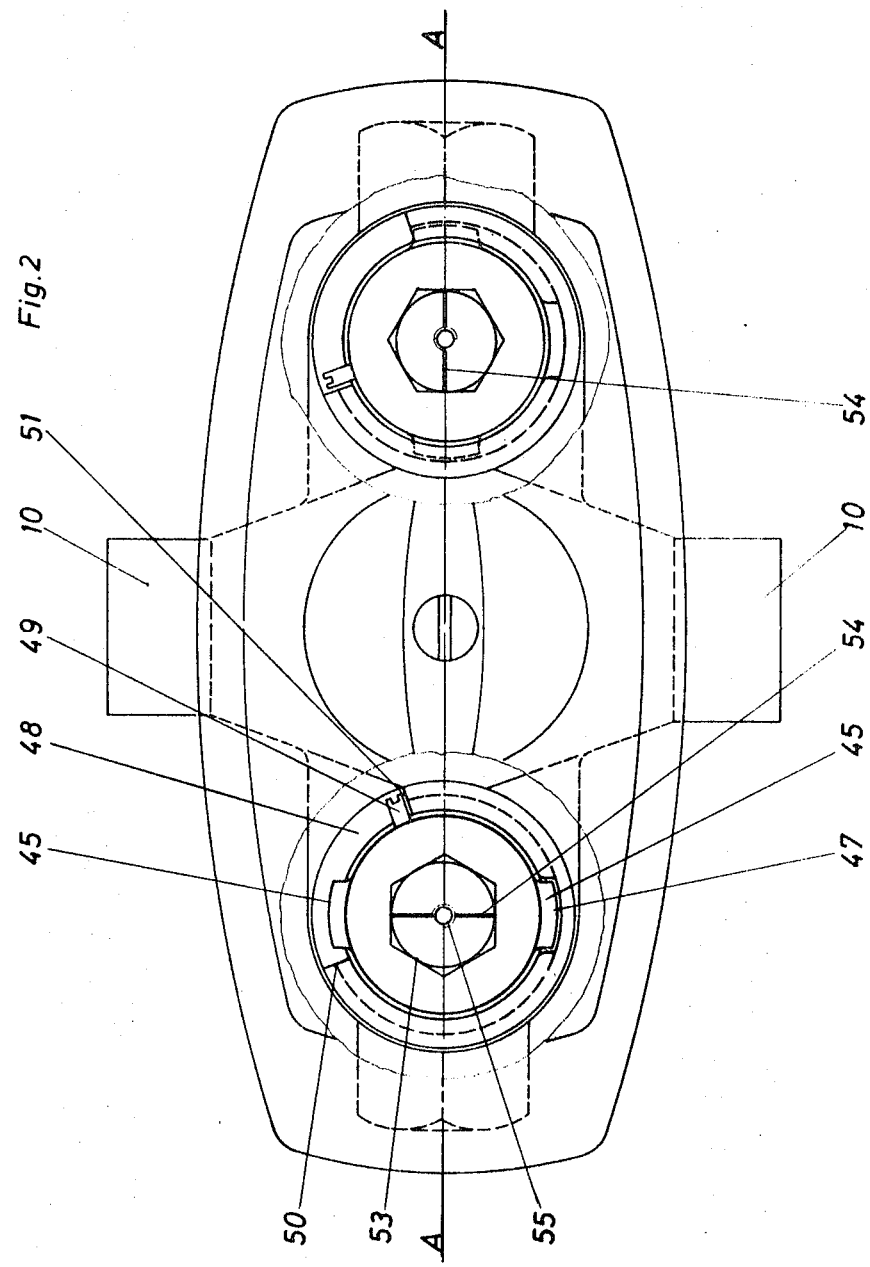

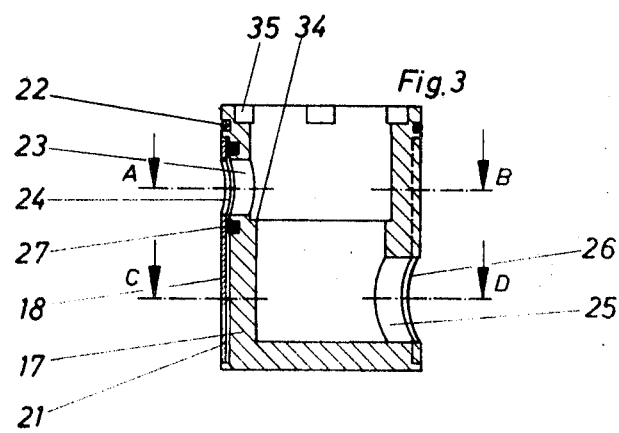
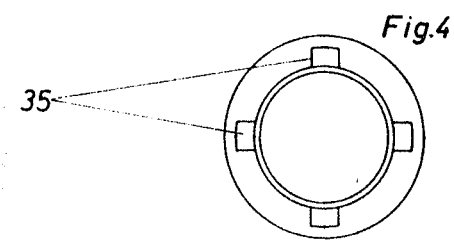
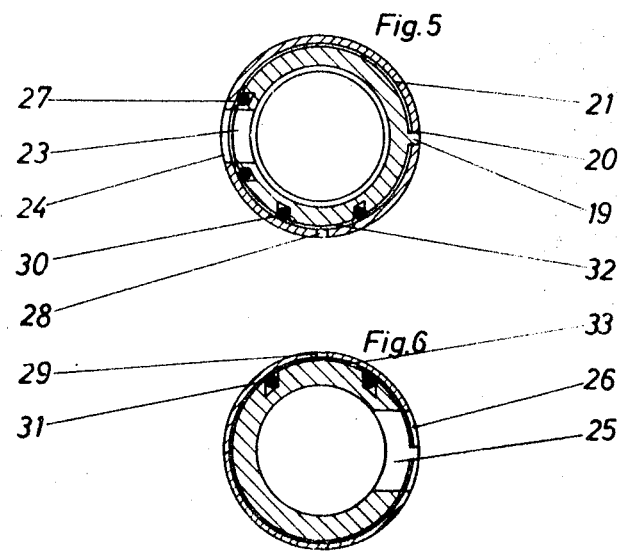

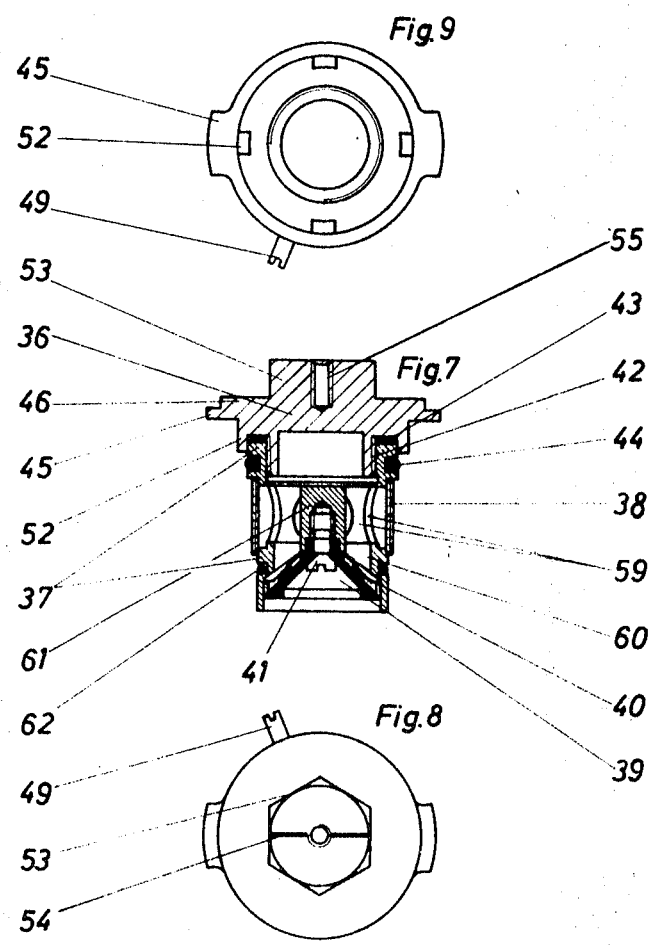

HOT AND COLD WATER MIXING VALVES

BACKGROUND OF THE INVENTION

The present invention relates to a technological advance in mixing valves of every type used in washrooms, and in particular to those valves in which the temperature of the mixing water is thermostatically regulated.

Mixing valves must be provided with check valves with filters or screens to prevent the danger of backflow or overflow at the cold and hot water side. These check valves are built into the connections or waterlines of the valve, and are of course not installed for regulating or blocking the waterflow. Such a built-in design has the disadvantage that when the check valves are to be serviced through, for example, interchanging the membrane or cleaning the filter, the entire valve must be unscrewed each time. This requirement involves considerably skilled assembly work with accompanying high costs and loss in time. In addition, thereto, the main water valve must be closed off to permit such work. This problem can be reduced somewhat when the waterlines leading to the valve includes separate cutoff or regulating valves in front of the mixing valve. While such an arrangement requires considerable in parts or equipment, it has, on the other hand, the attractive advantage that when continuously different pressures prevail in both waterlines, one or the other waterline may be throttled. Moreover, when repairs on the mixing valve are to be performed, a fully localized cutoff of the waterflow may be realized. Additionally, such an arrangement affords the possibility that in large installations as, for example, in public baths, a simple volume regulation may be carried out.

The present invention has, consequently, the object to provide a mixing valve in which each waterline leading to the valve is provided with a required check valve with filter or screen, and has in conjunction thereto, a cutoff or regulating valve, without incurring any substantial increase in the structural length and volume of the valve. It is also an object of the present invention to provide such a valve arrangement in which the check valves with filter may be serviced and repaired with replacement of the filter requiring no disassembly or assembly of the mixing valve and without requiring any auxiliary work. It is a specific object of the present invention to provide such a valve arrangement which can be readily repaired and provides access for servicing simply through a single rotation of the cutoff or regulating valve into the fully closed position.

The objects of the present invention are achieved through the feature that the cutoff valve within the waterlines leading to the mixing valve, is constructed in the form of a control sleeve which is opened to exterior. By rotating the control sleeve through an angle of 90°, both passages at the water inlets are entirely opened or are entirely closed. Within this control sleeve, a hollow insert is arranged in an assembly unit with the check valve and filter. The hollow insert is guided so that in the operating position of the valve, it is coupled with the control sleeve and becomes rotatable therewith. The hollow insert is removable or insertable out of or into the control sleeve only when the latter is in the fully closed position, in which the fluid passages on both sides of the sleeve are closed off, and the sleeve runs dry.

SUMMARY OF THE INVENTION

A mixing valve for use in conjunction with hot and cold water and thermostatic regulating means. The waterlines leading to the valve include at the connections to the valve, sleeve members which have passages that may be fully closed and fully opened through 90° rotation of the sleeve member. The passages in the sleeve member are, furthermore, displaced from each other. The sleeve member also contains a check valve with a filter or screen, and a hollow insert member is, furthermore, mounted on the check valve and is operatively coupled to the sleeve member. The arrangement is such that the sleeve rotates with the hollow insert member, and the latter is removable and insertable from and into the sleeve, when the latter is in the fully closed position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a cross-sectional view through the longitudinal axis of the mixing valve, in accordance with the present invention, in which a cutoff valve is shown in closed and opened positions at the left and right side of the Figure, respectively;

FIG. 2 is a plan view of the assembled mixing valve of FIG. 1;

FIG. 3 is a sectional view taken through the longitudinal axis of the control sleeve member used for regulating waterflow within said valve of FIG. 1;

FIG. 4 is a plan view of a control sleeve member of FIG. 3;

FIG. 5 is a sectional view taken along line A–B in FIG. 3;

FIG. 6 is a sectional view taken along line C–D in FIG. 3;

FIG. 7 is a sectional assembly view of the hollow insert member used in the construction of the valve of FIG. 1;

FIG. 8 is a plan view of the hollow insert member of FIG. 7; and

FIG. 9 is a bottom view of the hollow insert member of FIG. 7.

DESCRIPTION OF THE PREFERRED EMBODIMENTS

Referring to the drawing, the valve housing 1 is provided with entrance feeds 2 and 3 for cold and warm water. Communicating chambers 4 and 5 are formed within the valve and lead to the tub and shower past the thermostatically actuated regulating valve member 63 in part located in the mixing chamber 6, and from there through the connecting portion 8 in which the water mixing pipe 7 runs longitudinally along the bimetallic thermostat 9 and through the exit portions or connections 10. A bushing insert 11 serves for retaining the control sleeve 17. The latter is soldered in with two soldered rings inserted in the ring-shaped notches 12. Through the use of such a separately fabricated retaining bushing or bearing bushing, a simplification in the casting is realized. The two openings 13 and 14 lying diametrically opposite in the bushing or bearing, are displaced from each other in the height direction for reasons to be described subsequently. The control sleeve with a snap ring inserted into the ring-shaped slot 15, is rotatably retained in the bushing. A further ring-shaped notch 16 contains a hollow insert member 36, 37 carrying a filter 38 for the check valve 39 and this is to be described subsequently. This hollow insert member 36, 37 is rotatably with side guide portions 45.

The control sleeve 17, shown in FIGS. 3 to 6, is made of metal or synthetic material such as plastics. The design of this control sleeve 17 is such that it has the same contour and the same displaced passages or openings as the bushing 11, and is surrounded with a covering sleeve 18 having a longitudinal slot and being of smooth synthetic material. The covering sleeve 18 is fixed against the control sleeve so that it does not rotate relative thereto. The arrangement is such that an axially running projecting portion 19 lies within the slot 20 of the covering sleeve, as shown in FIG. 5. Axial displacement of the covering sleeve is, furthermore, prevented through the design that the covering sleeve lies within a recessed portion 21 at the periphery of the control sleeve. The control sleeve is sealed off with respect to the exterior through the O-ring 22. At the interior of the control sleeve, is a feed bore, shown in the section A–B in FIG. 5. This feed bore communicates with the opening 13 of the insert bushing together with the covering opening 24 of the covering sleeve 18. Such communication takes place when the control sleeve is in its entirely opened or fully opened position. This situation is illustrated in the right-hand portion of FIG. 1. The runoff bores 25 and 26 lying diametrically opposite and being displaced in height in the control and covering sleeves, communicate with the opening 14 of the insert bushing, in this position. Through the O-ring 27 arranged around the bore 23, this bore becomes sealed off between the control and covering sleeves. At the same time, the springed action of the covering sleeve is increased through this O-ring. In the planes A–B and C–D, the covering sleeve has also small bores 28 and 29 of approximately 2 millimeters. These small bores 28 and 29 are surrounded by the O-rings 30 and 31 which are admitted by the control sleeve. The bores 28 and 29 are, furthermore, arranged longitudinally, as shown in FIGS. 5 and 6, so that when the control sleeve is in the fully closed position, these bores communicate with the openings 13 and 14 of the insert bushing 11. Through the two O-rings, the spring action of the covering sleeve is amplified or increased in all positions. The annular spaces or gaps 32 and 33 established through the two O-rings, on the other hand, communicate with the water when the control sleeve is in the fully closed position. These annular spaces or gaps 32 and 33 function in conjunction with the water pressure so as to provide pressure compensation and a servo spreading effect of the covering sleeve, so that an unconditionally secure watertight closure is realized on both sides. A shoulder 34 in the control sleeve 17 serves as support for the ring-shaped filter 38 of the check valve 39 and filter containing hollow insert member 36, 37 to be subsequently described. The four recessed portions 35 serve for rotatably coupling with the hollow insert member by means of the take-along or clutching member 52.

The hollow insert member consists of the closure cap 36 for closing off the opening of the control sleeve and the valve housing 37. The latter is fabricated or produced separately and is tightly screwed onto the threaded portion 42 of the closure cap with flat seal 43. The valve housing or body carries the ring-shaped filter 38 on its circumference or perimeter and over the openings 59. The base of the valve housing is constructed in the form of a hollow tapered portion with a plurality of passages 60. A soft rubber membrane 39 lies upon this hollow tapered base, and is correspondingly shaped with a hollow taper. The soft rubber membrane 39 is held or retained through the screw 41 which is threaded into the base portion 61. A basket-shaped and perforated thin tapered portion 40 made of synthetic material lies between the membrane and the base, and prevents any drawing in of the soft membrane into the relatively large opening 60. When the body is inserted into the control sleeve, water flows from the upper-lying inlets 23 and 24 in the control sleeve, through the filter 38 and downward through the openings 59. Such flow takes place in the open position of the valve as shown in FIG. 1, at the right side portion thereof. After flowing through the opening 59, the water passes through the base openings and the basket, as well as the check valve 39, and flows from there through the lower lying outlets 25 and 26 toward the mixing chamber 6. The O-rings 44 and 62 serve, thereby, to seal seepage of water to the outside of the valve. As mentioned above, the side portions 45 on the flange 46 serve to guide and fix axially the hollow insert member in the ring-shaped notch 16 of the valve. The vertical portions 52, on the other hand, reach into the recess portions 35 of the control sleeve and rotate the latter therealong. In order that the removal and insertion of the hollow insert body within the hollow chamber of the control sleeve 17 becomes possible only when the control sleeve is in the fully closed position, one of the two recesses 48 and 47 are longitudinally arranged on the periphery or perimeter so that removal or insertion of the hollow insert member can take place only when the control sleeve is in the fully closed position, as shown in the left-handed portion of FIG. 2. When the control sleeve is in the fully closed position, the passages on both sides thereof, are closed off. The recesses 47 and 48 interrupt the insertion of the two guide portions 45 into the ring-shaped notch 16. The other recess has the advantage of a circumferential length of 90°, and a pin 49 arranged on the flange 46 limits the maximum rotational movement to precisely 90° at the abutting portions 50 and 51, corresponding to the positions of fully opened and fully closed.

For actuating in rotation, removal, etc., the hollow insert member 36, 37 carry, for example, a closure member 53 with a threaded hole 55. The threaded hole serves in an advantageous manner, simultaneously, to receive the mounting screws 56 with which the wall rosette member 57 is drawn to the assembly wall over the foam or aerating member 58.

The thermostatically controlled valve which controls flow of cold and hot water from the chambers 4 and 5, into the mixing chamber 6 comprises a hollow valve member 6 having a lower portion slidably guided in socket 63 projecting inwardly from the housing 1, and an upper conical portion having an outer surface cooperating with a valve seat 67 and an inner surface cooperating with another valve seat 68 of a cup-shaped member coaxially fixed to a spindle 69 extending centrally through the valve housing. The valve member 63 is resiliently balanced between the compression spring 66 sandwiched between the bottom face of the valve member and a central hub on the valve housing and a column of annular bimetal elements 65 surrounding the spindle. The lowermost of the bimetal elements 65 abuts against the upper end of the valve member 63 and the uppermost of the bimetal elements abuts against a nut 72 which can be adjusted in axial direction by turning the knob 71 and the member 70 connected thereto to which the nut 72 is in turn connected for rotation therewith and for movement in axial direction relative thereto. The fluid in the mixing chamber 6 is in contact with the bimetal members 69 so that the latter will expand or contract in dependence on the temperature of the fluid to thereby move the valve member 63 downwardly or upwardly thereby throttling either flow of cold water or hot water into the mixing chamber 6. By adjusting the precompression imparted to the bimetal members 69 by changing the axial position of the nut 72, the temperature of the mixed water flowing out from the valve according to the present invention may therefore be regulated.

The mixing valve, in accordance with the present invention, is a technical advance in the art by providing a regulating and cutoff valve, besides the check valve with the filter, without increase in structural length and volume of the valve, and without increasing the fabricating costs. The check valve with filter forms an assembly which can be inserted and removed without assembling or de-assembling the valve. Such insertion and removal can be realized only when the regulating valve is in the fully closed position, and waterflow is interrupted on both sides of the valve. In this manner, further cutoff or blockage is not necessary. Pressure heads, backflow or overflow of water from one line into another is prevented in each case with the construction of one or both of the check valves. In mixing valves with thermostatic control, it is not necessary to de-assemble the valve for the purpose repairing or interchanging the thermostatic parts, which is of particular advantage in lower located valves.

It will be understood that each of the elements described above, or two or more together, may also find a useful application in other types of constructions differing from the types described above.

While the invention has been illustrated and described as embodied in mixing valves, it is not intended to be limited to the details shown, since various modifications and structural changes may be made without departing in any way from the spirit of the present invention.

What I claim as new and desire to protect by Letters Patent is:

1. A mixing valve for mixing hot and cold fluids comprising, in combination, a valve housing; thermostatic means within said housing for regulating the temperature of said fluid; fluid line connecting means on said housing for transmitting said fluids to the interior of said housing; sleeve means in said fluid line connecting means and having passages fully closeable and fully openable through substantially 90° of rotation of said sleeve means; check valve means with filter in said sleeve means; and a hollow insert member on said check valve means and operatively coupled to said sleeve means so that said sleeve means rotates with said insert member, said insert member being removable and insertable from and into said sleeve means when said sleeve is in fully closed position.

2. The mixing valve as defined in claim 1 wherein said hollow insert member has projecting portions reaching into recesses of said sleeve means for rotating said sleeve means during rotation of said hollow insert member, said hollow insert member having further guide portions within ring-shaped notch at said fluid line connection means, whereby said hollow insert member is insertable and removable only when said sleeve means is in the fully closed position.

3. The mixing valve as defined in claim 1 wherein said passages in said sleeve means are displaced from each other so that fluid flow is directed from one passage into the other passage through said filter and the interior of said hollow insert member, said sleeve surrounding said hollow insert member and said check valve means being arranged at the base of said hollow insert member.

4. The mixing valve as defined in claim 1 including O-ring means arranged on both sides of said filter, said filter being a filter sleeve surrounding said hollow insert member.

5. The mixing valve as defined in claim 1 wherein said check valve means comprises a taper-shaped membrane for pressing against a corresponding taper-shaped perforated base of said hollow insert member; and a securing screw for mounting in place said membrane.

6. The mixing valve as defined in claim 5 wherein said membrane is a soft rubber membrane.

7. The mixing valve as defined in claim 1 wherein said hollow insert member comprises two separately fabricated parts assembled through screw threads and having a cutoff cap.

8. The mixing valve as defined in claim 1 including a bushing member with passages surrounding said sleeve means and being soldered in corresponding bores within said fluid line connecting means, said sleeve means being a separately fabricated member.

9. The mixing valve as defined in claim 1 including a spring member surrounding said sleeve means and having a longitudinal slot, said spring member being secured to said sleeve means; and O-ring means spread sealingly through said spring member.

10. The mixing valve as defined in claim 9 including O-ring means on said sleeve means and forming annular spaces under pressure when said sleeve means is in the fully closed position, said spring member having substantially small passages.

11. The mixing valve as defined in claim 1 wherein said sleeve means, hollow insert member with check valve means and filter are interchangeable between hot and cold fluid line connecting means.

12. The mixing valve as defined in claim 1 wherein said hollow insert member has a cutoff flange and actuating means.

13. The mixing valve as defined in claim 12 wherein said actuating means comprises a coated edge with threaded opening.